(12) United States Patent
Liang et al.

(10) Patent No.: US 8,204,072 B2
(45) Date of Patent: Jun. 19, 2012

(54) METHOD AND DEVICES FOR DETERMINING AVAILABLE FREQUENCY RANGES

(75) Inventors: Ying Chang Liang, Singapore (SG); Anh Tuan Hoang, Singapore (SG); Ashok Kumar Marath, Singapore (SG); Zhongding Lei, Singapore (SG); Po Shin Francois Chin, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 12/092,964

(22) PCT Filed: Nov. 7, 2006

(86) PCT No.: PCT/SG2006/000336
§ 371 (c)(1),
(2), (4) Date: Nov. 21, 2008

(87) PCT Pub. No.: WO2007/053125
PCT Pub. Date: May 10, 2007

(65) Prior Publication Data
US 2009/0252048 A1 Oct. 8, 2009

Related U.S. Application Data

(60) Provisional application No. 60/734,080, filed on Nov. 7, 2005, provisional application No. 60/796,355, filed on Apr. 28, 2006.

(51) Int. Cl.
*H04J 4/00* (2006.01)
*H04J 3/02* (2006.01)
*H04B 7/00* (2006.01)

(52) U.S. Cl. .................. 370/436; 370/462; 455/509
(58) Field of Classification Search .................. None
See application file for complete search history.

(56) References Cited

U.S. PATENT DOCUMENTS

| | | | | |
|---|---|---|---|---|
| 2002/0009158 A1* | 1/2002 | Souissi et al. | ........... | 375/295 |
| 2002/0061031 A1* | 5/2002 | Sugar et al. | ........... | 370/466 |
| 2002/0105970 A1 | 8/2002 | Shvodian | | |
| 2002/0131455 A1* | 9/2002 | Cioffi et al. | ........... | 370/503 |
| 2003/0017830 A1* | 1/2003 | Kayama et al. | ........... | 455/450 |
| 2003/0076855 A1* | 4/2003 | Chamberlain | ........... | 370/447 |
| 2003/0095562 A1* | 5/2003 | Liu et al. | ........... | 370/442 |
| 2004/0031058 A1* | 2/2004 | Reisman | ........... | 725/112 |
| 2004/0081121 A1* | 4/2004 | Xu | ........... | 370/329 |

(Continued)

FOREIGN PATENT DOCUMENTS
EP 1 261 227 A1 11/2002
(Continued)

OTHER PUBLICATIONS

International Search Report on PCT SG2006-000336, mailed on Jan. 4, 2007.

(Continued)

*Primary Examiner* — Clemence Han
(74) *Attorney, Agent, or Firm* — Choate, Hall & Stewart, LLP

(57) ABSTRACT

A method of determining available frequency ranges for at least one communication device is provided. The method comprises providing a downlink transmission time interval, determining available frequency ranges within a plurality of frequency ranges after the downlink transmission time interval, and providing an uplink transmission time interval after the determining of the available frequency ranges.

27 Claims, 5 Drawing Sheets

U.S. PATENT DOCUMENTS

| | | | |
|---|---|---|---|
| 2004/0151143 A1* | 8/2004 | Abdesselem et al. | 370/336 |
| 2004/0203815 A1 | 10/2004 | Shoemake et al. | |
| 2005/0135327 A1 | 6/2005 | Cooper | |
| 2008/0259859 A1* | 10/2008 | Cordeiro et al. | 370/329 |
| 2010/0296511 A1* | 11/2010 | Prodan et al. | 370/389 |
| 2010/0303033 A1* | 12/2010 | Shahar et al. | 370/329 |

FOREIGN PATENT DOCUMENTS

| | | |
|---|---|---|
| EP | 1303162 A2 | 4/2003 |
| EP | 1 343 338 A1 | 9/2003 |
| EP | 1 465 448 A2 | 10/2004 |
| JP | 2000-022712 | 1/2000 |
| JP | 2002-158667 | 5/2002 |
| WO | WO-01-31942 | 5/2001 |
| WO | WO 01/31942 | 5/2001 |

OTHER PUBLICATIONS

Written Opinion by the ISA on PCT SG2006-000336, mailed on Jan. 4, 2007.

International Preliminary Report on Patentability on PCT SG2006-000336, mailed on May 7, 2008.

A PHY/MAC Proposal for IEEE 802.22 WRAN System, Part 2: The Cognitive MAC, by Etri, FT, Hua Wei, I2R, Motorola, NextWave, Philips, Runcom, Samsung, STM, Thomson, Mar. 2006.

European Search Report for EP 06813116.8, mailed on Mar. 9, 2011, (9 pages).

Office Action for Japanese Application No. 2008-53993, mailed on Dec. 6, 2011, and English translation (4 pages).

* cited by examiner

| Name | Element ID (1 byte) | Length (bytes) | Value |
|---|---|---|---|
| Downstream_Burst_Profile | 1 | | Value reserved for the burst profile. |
| BS EIRP | 2 | 2 | Singed in units of dBm |
| Reserved | 3 | | |
| TTG | 4 | 1 | TTG in slots |
| RTG | 5 | 1 | RTG in slots |
| $RSS_{IR,max}$ | 6 | 2 | Initial ranging maximum received signal strength at BS in units of 1dBm |
| BS ID | 7 | 6 | Base Station ID. This is needed in addition to the ID contained in the SCH, so that CPEs can distinguish messages from different collocated BSs. |
| Frame Duration Code | 8 | 1 | Time duration of the frame. |
| Frame Number | 9 | 1 | The number of the frame containing the DCD message |
| Channel Action | 10 | 1 | Action to be taken by all CPEs in a cell.<br>0 = None<br>1 = Switch<br>2 = Add<br>3 = Remove<br>4 = Quiet |
| Action Frame Number | 11 | 1 | The starting frame number at which the Channel Action shall be performed by all CPEs. |
| Action Duration | 12 | 2 | This is valid only for quiet periods (Action = 4).<br><br>• If this field is set to a value different from 0 (zero): It indicates the duration (expressed in slots), not including the Action Frame Number. Once this duration is over, normal operation resumes in the channel by the BS. If quiet periods are already scheduled after Action Frame Number, the value specified in this field shall override the length of the first quiet period after Action Frame Number. During this time, the CPE shall sense for incumbents only. If more detailed specification is needed, please see.<br><br>• If this field is set to 0 (zero): it serves to indicate CPEs that the first quiet period after Action Frame Number is cancelled. Therefore, normal data transmission shall be carried out during this time. |
| Action Channel Number | 13 | 1 | |
| Action Number of Channels | 14 | 1 | |
| Channel Number for Backup | 15 | 1 | The backup channel to be used by CPEs in case of loss of communication with the BS due to incumbents. If possible, the backup channel(s) shall be a disjoint set with the current operating channels. |
| Number of Channels for Backup | 16 | 1 | The number of backup channels. To maximize the success probability that the backup channel is vacant when needed, this field should be set to 1. |
| Sensing RTG or Sensing TTG | 17 | 1 | If set to 1, the CPE shall perform fast sensing (i.e., energy detection) during RTG.<br>If set to 2, the CPE shall perform fast sensing during TTG. |
| Channel Number for Sensing RTG or Sensing TTG | 18 | 1 | The channel number that is to be sensed during the Sensing RTG or Sensing TTG. |
| MAC version | 148 | 1 | |

Figure 6

METHOD AND DEVICES FOR DETERMINING AVAILABLE FREQUENCY RANGES

The present application claims the benefit of U.S. provisional applications 60/734,080 (filed on 7 Nov. 2005) and 60/796,355 (filed on 28 Apr. 2006), the entire contents of which are incorporated herein by reference for all purposes.

The present invention refers to a method of determining available frequency ranges for a communication device, as well as to a respective device.

Due to the advent of wireless communication technology, frequency spectrum is becoming an extremely precious commodity. It is becoming increasingly difficult to obtain available frequency spectrum for new wireless communication technologies and applications. It is therefore an objective nowadays to maximize the use of all existing allocated frequency spectrum.

An approach which can be used to achieve this objective of maximizing the use of all existing allocated frequency spectrum is a concept called opportunistic spectrum access. How opportunistic spectrum access works can be described as follows.

Within a frequency spectrum already allocated, a frequency range of interest is typically licensed for an incumbent communication service. However, it is possible that this incumbent communication service may not be in operation at certain locations during specific times. According to the concept of opportunistic spectrum access, other communication services should take the opportunity to operate at this frequency range at these locations during the times when the incumbent communication service is not in operation.

In this regard, since the incumbent communication service is the licensed user of frequency range of interest, it must have the highest priority of usage. This means that whenever the incumbent communication service goes back into operation again, these other communication services must stop using the frequency range of interest immediately.

Therefore, in order to be able to perform all the actions described above, these other communication services must have the capability to determine whether a frequency range of interest is used by an incumbent communication service. If it is determined that the frequency range of interest is not being used by an incumbent communication service, then these other communication services can use the frequency range of interest. In addition, if it is determined that the frequency range of interest is being used again by the incumbent communication service, then these other communication services must stop operating and vacate the frequency range of interest immediately, so that the transmissions of these other communication services do not become interference to the incumbent communication service.

In view of the above, when these other communication services are using a frequency range of interest, they must periodically monitor the frequency range they are operating in, in order to determine whether an incumbent communication service is using that frequency range again. It is therefore desirable for these other communication services to have an efficient and effective approach of determining the availability of the frequency ranges, in which they are operating.

There are methods available today for determining the availability of the frequency ranges. For all these methods, a period of no transmission by all devices, or a quiet period, is scheduled to allow all devices to determine whether there are incumbent communication services operating within their frequency range of operation.

In existing methods for determining the availability of the frequency ranges, the quiet periods are all scheduled in such a way that the quiet period always preceded by an uplink transmission. As such, the frequency range of interest can only be free from transmitted signals after considering the propagation delay of the transmission from the device furthest away from the communication device. Therefore, due to the effect of propagation delay, the period when the frequency range of interest is truly free from transmitted signals is significantly shorter than the scheduled quiet period, which may not be sufficient to determine whether there are incumbent communication services operating within the frequency range of operation.

In order to overcome the problem described above, it has been proposed in [1] to introduce an additional timing offset interval between the end of the uplink transmission time interval and the start of the scheduled quiet period. However, this proposed solution has the following disadvantages.

Firstly, the additional timing offset interval reduces the amount of time actually used for data transmission, which will result in a lower overall system efficiency.

Secondly, due to the effect of multi-paths, the transmission from the device furthest away from the communication device may not be fully accounted for by considering the propagation delay alone. As the additional timing offset interval is introduced to negate the effect of the propagation delay, it cannot ensure that there are no more transmitted signals from devices when the determining of whether there are incumbent communication services operating within the frequency range of operation starts. Therefore, it is not possible to reliably determine whether there are incumbent communication services operating within the frequency range of interest during the start of quiet period scheduled.

This problem is solved by the method and devices as defined in the respective independent claims of the present application.

In a first aspect of the invention, a method of determining available frequency ranges for at least one communication device is provided, comprising providing a downlink transmission time interval, determining available frequency ranges within a plurality of frequency ranges after the downlink transmission time interval, and providing an uplink transmission time interval after the determining of the available frequency ranges.

In a second aspect of the invention, a frequency ranges determination device for determining available frequency ranges for at least one communication device is provided, comprising a first unit providing a downlink transmission time interval, a determination unit determining available frequency ranges within a plurality of frequency ranges after the downlink transmission time interval, and a second unit providing an uplink transmission time interval after the determining of the available frequency ranges.

In a third aspect of the invention, a communication device is provided, comprising a frequency ranges determination device for determining available frequency ranges for at least one communication device, the frequency ranges determination device comprising a first unit providing a downlink transmission time interval, a determination unit determining available frequency ranges within a plurality of frequency ranges after the downlink transmission time interval, and a second unit providing an uplink transmission time interval after the determining of the available frequency ranges.

Illustratively, the frame structure used in a transmission is analyzed in order to determine suitable quiet periods for determining whether a frequency range is being used or not. After determining that it is suitable to select the quiet period after a downlink transmission, a plurality of possible quiet periods after a downlink transmission are analyzed and suitable candidates for use as quiet periods are determined.

The embodiments which are described in the context of the method of determining available frequency ranges for at least one communication device provided, are analogously valid for the devices.

As defined earlier, the communication device may be, but is not limited to, a wireline communication device, a powerline communication device, a radio communication device, a terminal communication device or a Consumer Premise Equipment device. A radio communication device, for example, may be but is not limited to, a mobile radio communication device, a satellite radio communication device, or a mobile radio base station.

The method of determining available frequency ranges for at least one communication device provided, may be used in any communication system which uses time division duplex (TDD), for example. In TDD, time division is used to enable bi-directional communication on a single communication resource. While TDD is typically used in wireless communications, TDD may also be used in non-wireless communications. Accordingly, in this embodiment, the communication device may also be a wireline communication device or a powerline communication device.

As used herein, downlink transmission to a communication device refers to a transmission in the direction from the other communication device to the communication device.

For example, the other communication device may be a transmitting and/or receiving station, which is usually strategically located. In one embodiment, the other communication device may be a base station.

In this conjunction, a downlink transmission time interval refers to a predefined amount of time scheduled for a downlink transmission.

In contrast to downlink transmission, an uplink transmission from a communication device refers to a transmission in the direction from the communication device to the other communication device.

In this regard, an uplink transmission time interval refers to a predefined amount of time scheduled for an uplink transmission.

In one embodiment of the invention, an uplink transmission is scheduled after a downlink transmission, which will be followed by another downlink transmission. In a similar manner, a downlink transmission is scheduled after an uplink transmission, which will be followed by another uplink transmission. Accordingly, the scheduled transmission may be a series of transmissions continuously alternating between uplink transmissions and downlink transmissions.

Embodiments of the invention emerge from the dependent claims.

According to one embodiment of the invention, once the downlink transmission time interval ends and the communication device completes the reception of the downlink transmission, the step of determining available frequency ranges within a plurality of frequency ranges after the downlink transmission time interval is carried out within a scheduled quiet period.

If it is determined that the scheduled quiet time is sufficient, then once the determination of the available frequency ranges is completed, an uplink transmission time interval is provided in one embodiment of the invention. Accordingly, after the determination of the available frequency ranges, an uplink transmission time interval is provided.

On the other hand, if it is determined that the scheduled quiet time is insufficient, then the next uplink transmission time interval may be allocated as a quiet time. In this case, once the determination of the available frequency ranges is completed, another downlink transmission time interval is provided. Accordingly, in one embodiment, a further downlink transmission time-interval is provided after the determination of the available frequency ranges.

It is also possible that the originally scheduled quiet time is significantly longer than what is required to determine available frequency ranges within a plurality of frequency ranges. In this case, the communication device may be allowed to begin uplink transmission earlier than scheduled.

In addition, if there is more than one communication device, a first communication device, which is nearer to the other communication device, may begin its uplink transmission earlier than a second communication device which is further from the other communication device. Accordingly, in one embodiment, the method provided further comprises providing a plurality of further uplink transmission time intervals after the determination of the available frequency ranges.

In one embodiment, the method provided further comprising providing a plurality of further downlink transmission time intervals after the determination of the available frequency ranges.

In one embodiment, the method provided further comprises waiting a predetermined time period after the downlink transmission time interval, and determining available frequency ranges within a plurality of frequency ranges after expiration of the predetermined time period.

Waiting a predetermined time period after the downlink transmission time interval is carried out, to ensure that there is no residual transmission signal from the other communication device in the transmission medium, for example, due to multi-paths, before beginning the step of determining available frequency ranges within a plurality of frequency ranges. Accordingly, in one embodiment, the predetermined time period is dimensioned such that the downlink transmission signals have been completely transmitted via the frequency ranges.

In one embodiment, the method provided is carried out within at least one data transmission frame structure, wherein the data transmission frame structure comprises a downlink subframe provided for the downlink transmission time interval, a sensing subframe provided for the determining of the available frequency and an uplink subframe provided for the uplink transmission time interval, wherein the sensing subframe is arranged between the downlink subframe and the uplink subframe.

As used herein, the term frame structure refers to the form which defines how a time interval is partitioned into a number of sub-intervals. In this context, a time interval of a predefined period is typically called a frame, and a sub-interval resulting from a predefined partitioning process is typically called a subframe. In this conjunction, an aggregate of a number of adjacent frames is typically called a superframe, or a frame group.

Typically, frames and sub-frames are used for data transmission. However, it is possible for a frame structure to have a number of frames and/or subframes assigned for non-data transmission functions, such as control functions. In one embodiment, a subframe in the frame is assigned for sensing.

Subframes may have the same or a different length (in terms of time). It is possible that subframes which are assigned for the same function may have the same length. For example, all downlink data transmission subframes may have the same length.

However, as explained before, subframes may have different lengths. For example, a subframe assigned for sensing and a downlink data transmission subframe may have different lengths. In another example, an uplink data transmission subframe and a downlink data transmission subframe may also have different lengths.

Likewise, frames may have the same or a different length.

As used herein, the term sensing refers to determining the available frequency ranges within a plurality of frequency ranges. In this regard, the term sensing sub-frame refers to a quiet period of a predefined length. For example, the sensing subframe may be, but is not limited to, the Transmit-Receive Transition Gap (TTG) in the system of [1].

In one embodiment, the method provided is carried out within at least one data transmission frame structure, wherein the data transmission frame structure comprises a frame group comprising a header portion and a plurality of frames, wherein the header portion comprising a downlink subportion for the downlink transmission time interval and a sensing subportion provided for the determining of the available frequency.

For example, the downlink subportion of the header portion may be, but is not limited to, the combination of the preamble transmission interval and the super frame control header (SCH) transmission interval in the system described in [1].

In one embodiment, the method provided further comprises determining available frequency ranges within a plurality of frequency ranges, combining the available frequency ranges to at least one combined logical frequency range and allocating the at least one combined logical frequency range to the first communication device.

According to the concept of opportunistic spectrum access described earlier, other communication services can operate at a frequency range when an incumbent communication service is not in operation. It is therefore possible that these other communication services do not have a continuous range of frequency to operate in. In view of this, it may be necessary to combine pockets of available frequency ranges, in order to achieve the minimum frequency bandwidth requirement for these other communication services to operate in. Accordingly, in this embodiment, the method provided further includes combining the available frequency ranges to at least one combined logical frequency range and allocating the at least one combined logical frequency range to the first communication device.

In one embodiment, the method provided further comprises scanning a plurality of frequency ranges, determining, whether a signal transmission in a respective frequency range is below a predetermined threshold. In the case where the signal transmission in the respective frequency range is below the predetermined threshold, then the frequency range is classified as available frequency range. In the case where the signal transmission in the respective frequency range is not below the predetermined threshold, then the frequency range is skipped or is classified as being non-available.

In this embodiment, it is described how determining available frequency ranges within a plurality of frequency ranges may be carried out. In addition, the relationship between signal transmission in a frequency range and the classification of a frequency range is also defined in relation to the predetermined threshold parameter. In this regard, the predetermined threshold is a settable parameter.

In one embodiment, the method provided further comprises the sensing period being dependent on the geographical distance between the communication device and another communication device.

In one embodiment, in the method provided, the other communication device is a base station.

In one embodiment, the method provided further comprises using a multiple access transmission technology. In another embodiment, the multiple access transmission technology being selected from a group of multiple access transmission technologies consisting of time division multiple access, frequency division multiple access, code division multiple access, or orthogonal frequency division multiple access.

It can be seen from the method provided by the invention that the quiet period is scheduled after a downlink transmission. This approach has the following advantages.

Firstly, so doing, once a communication device completes the reception of the downlink transmission at the end of the downlink transmission time interval, there are no more transmissions from any device. Accordingly, determining the available frequency ranges within a plurality of frequency ranges can be carried out immediately and reliably.

Secondly, this approach allows the existing frame boundaries to be maintained when additional time is allocated for the quiet period for sensing. Therefore, this facilitates the synchronization of the quiet periods for sensing among overlapping cells. This also facilitates the synchronization of the frame boundaries among overlapping cells, which is important for their coexistence.

Thirdly, this approach is simple in terms of implementation, and does not require any additional timing offset intervals which will result in a lower overall system efficiency.

FIG. 6 shows a table of Downlink Channel Descriptor (DCD) information elements of Medium Access Control (MAC) messages which may be changed to implement an embodiment of the invention.

FIG. 1 shows a communication system 100 according to an embodiment of the invention.

The communication system 100 comprises a communication system cell 101, which comprises a base station (BS) 103, a first communication device (CD1) 105, a second communication device (CD2) 107 and a third communication device (CD3) 109.

The data transmission of the communication cell 101 may use frequency ranges not used by the television transmission station (TS) 111, which is located near the communication cell 101. In this case, the television broadcast is the incumbent communication service.

Frame structures are typically used during a data transmission. For communication cell 101, a frame structure as illustrated in FIGS. 2, 3, 4 and 5 may be used during data transmission.

The communication system 100 may represent the proposed IEEE 802.22 wireless regional area network (WRAN) [1], which is an example of the other communication services operating based on the concept of opportunistic spectrum access. The proposed IEEE 802.22 WRAN operates in the very high frequency (VHF) and the ultra high frequency (UHF) frequency band (between 47 MHz and 910 MHz), which have already been allocated for the use of television (TV) broadcast and Part 74 wireless microphone devices.

In order to avoid causing interference to TV broadcasts and to Part 74 devices, WRAN devices, such as base stations (BS) and customer premise equipments (CPE), must be able to carry out a reliable detection of the incumbent communication services, while determining the availability of the frequency ranges in which they are operating.

Figure 1:
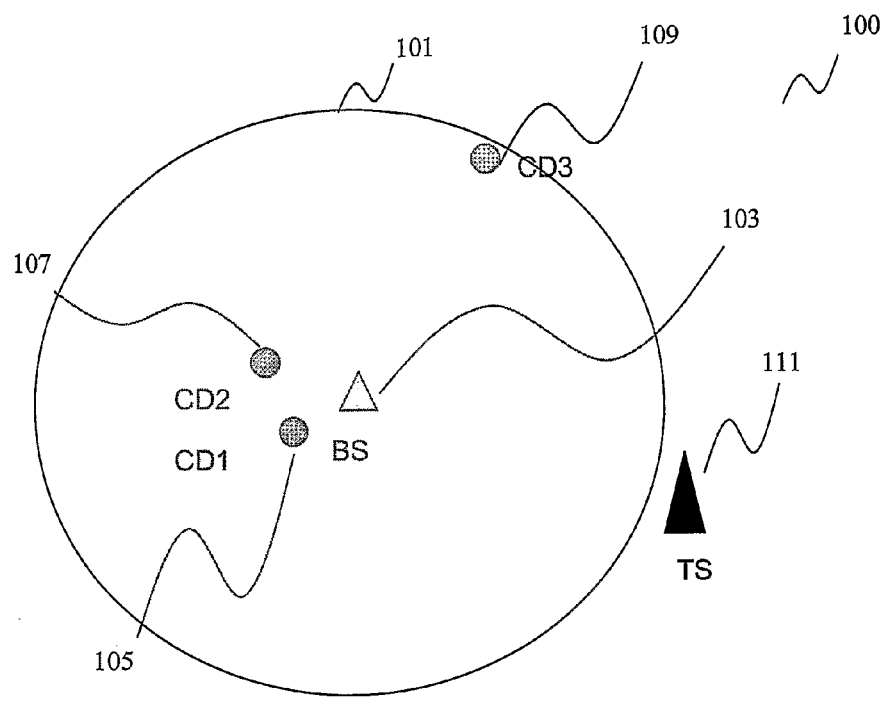
FIG. 1 shows a communication system according to an embodiment of the invention.
Figure 2:
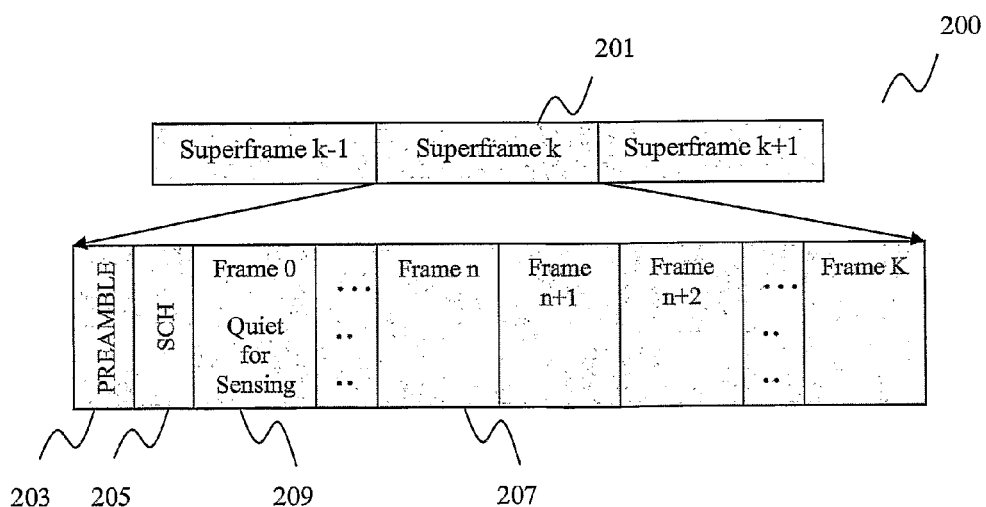
FIG. 2 shows a frame structure where Frame 0 (frame immediately after the SCH) is allocated as a quiet period for sensing according to an embodiment of the invention.

FIG. 2 shows a frame structure 200 according to an embodiment of the invention.

The frame structure 200 comprises a plurality of superframes. A superframe k 201 comprises a preamble transmission frame 203, a SCH transmission frame 205 and a plurality of frames 207, with Frame 0 209 allocated as a quiet period for sensing. In this case, both the preamble transmission frame 203 and the SCH transmission frame 205 are used for downlink transmissions, and the quiet period for sensing (Frame 0 209) is arranged to be after a downlink transmission.

According to one embodiment of the invention, the two-step sensing approach is used for determining the availability of the frequency ranges, which uses a fast sensing quiet period and a fine sensing quiet period. For example, the two-step sensing approach as described in [1] is used according to one embodiment of the invention.

The fast sensing quiet period can be employed to analyze the frequency range and to obtain a quick estimate on which part of the frequency range may be occupied by incumbent communication services. The fine sensing quiet period is typically employed to thoroughly analyze the frequency range in order to detect the presence of incumbent communication services. Therefore, the fine sensing quiet period is typically longer than the fast sensing quiet period.

In the context of a two-step sensing approach, the allocation of a quiet period after an SCH transmission (Frame 0 209), as shown in FIG. 2, is suitable for use as a fine sensing quiet period.

FIG. 2 is an illustration of one embodiment, where the data transmission frame structure 200 comprises a frame group comprising a header portion and a plurality of frames, wherein the header portion comprising a downlink subportion for the downlink transmission time interval and a sensing subportion provided for the determining of the available frequency. In this embodiment, the downlink subportion of the header portion may be the combination of the preamble 203 and the SCH 205, and the sensing subportion may be Frame 0 209.

Figure 3:
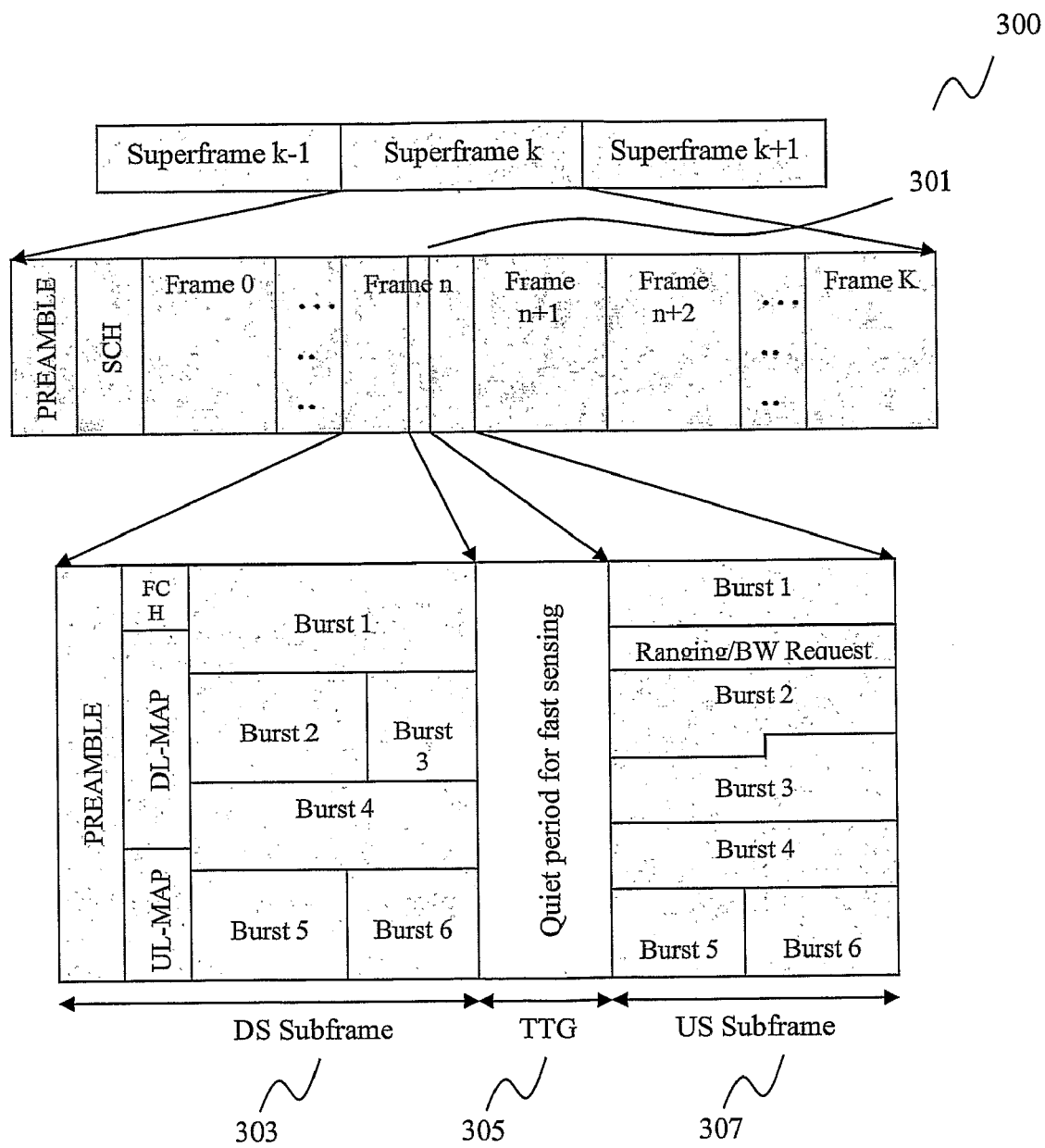
FIG. 3 shows a frame structure where the quiet period is allocated within the TTG time only, according to an embodiment of the invention.

FIG. 3 shows a frame structure 300 according to an embodiment of the invention.

The frame structure 300 comprises a plurality of superframes. Frame n 301 is a frame within superframe k. Frame n 301 comprises a downlink subframe (DS) 303, a Transmit-Receive Transition Gap time (TTG) 305 and an uplink subframe (US) 307, with the Transmit-Receive Transition Gap time 305 allocated as a quiet period for sensing. In this case, the quiet period for sensing is again arranged to be after a downlink transmission.

As the Transmit-Receive Transition Gap time 305 is relatively short, this quiet period is more suitable for use as a fast sensing quiet period. As used in fast sensing, the length of the downlink subframe 303 which precedes this quiet sensing period, may be fixed at a specified value, for example, equal to half the frame length. This is done to facilitate the synchronization of quiet periods for sensing among overlapping cells, say, for example, in a WRAN system.

Figure 4:
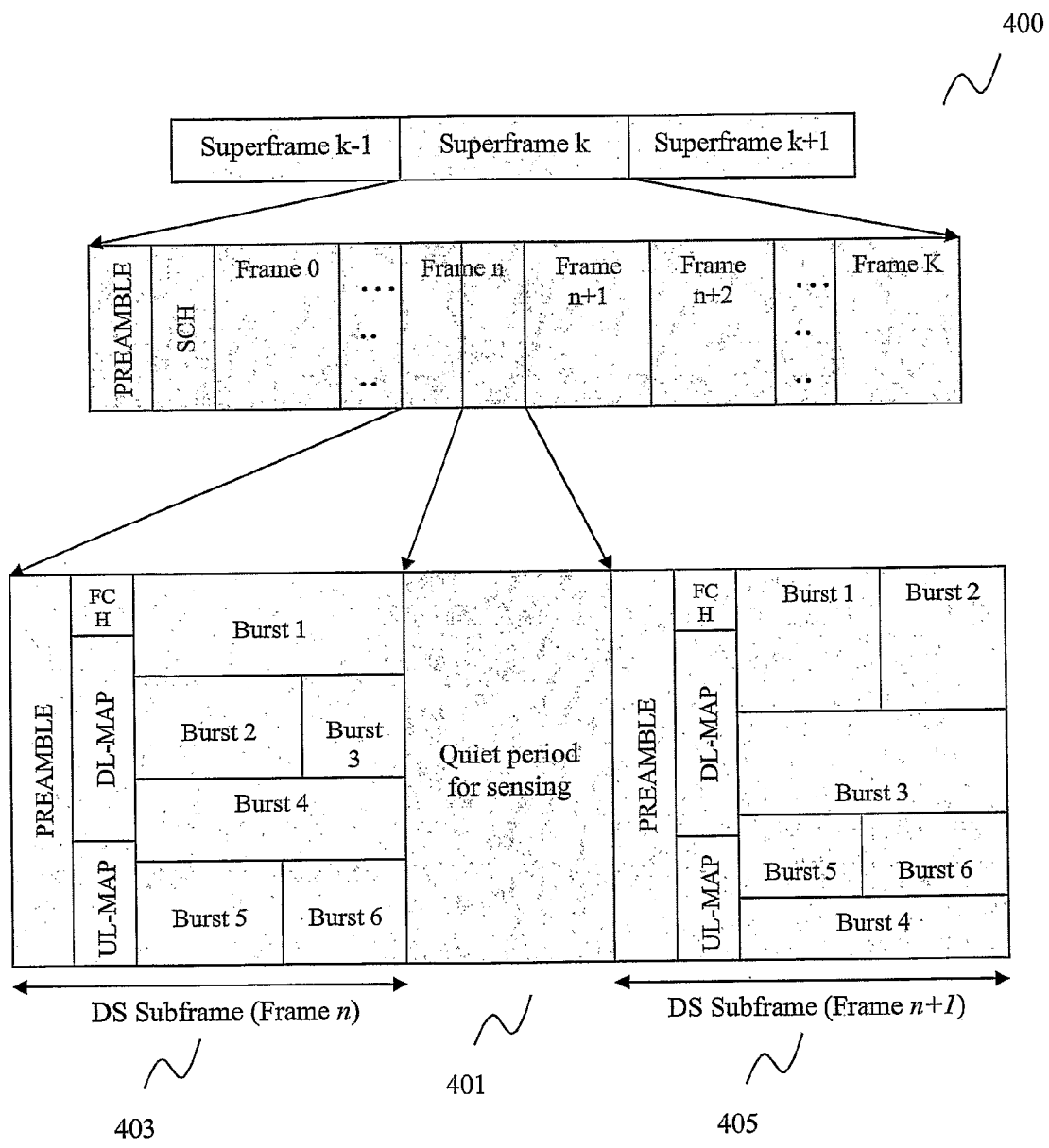
FIG. 4 shows a frame structure where the quiet period allocated includes the TTG time and the uplink subframe of Frame n, according to an embodiment of the invention.
Figure 5:
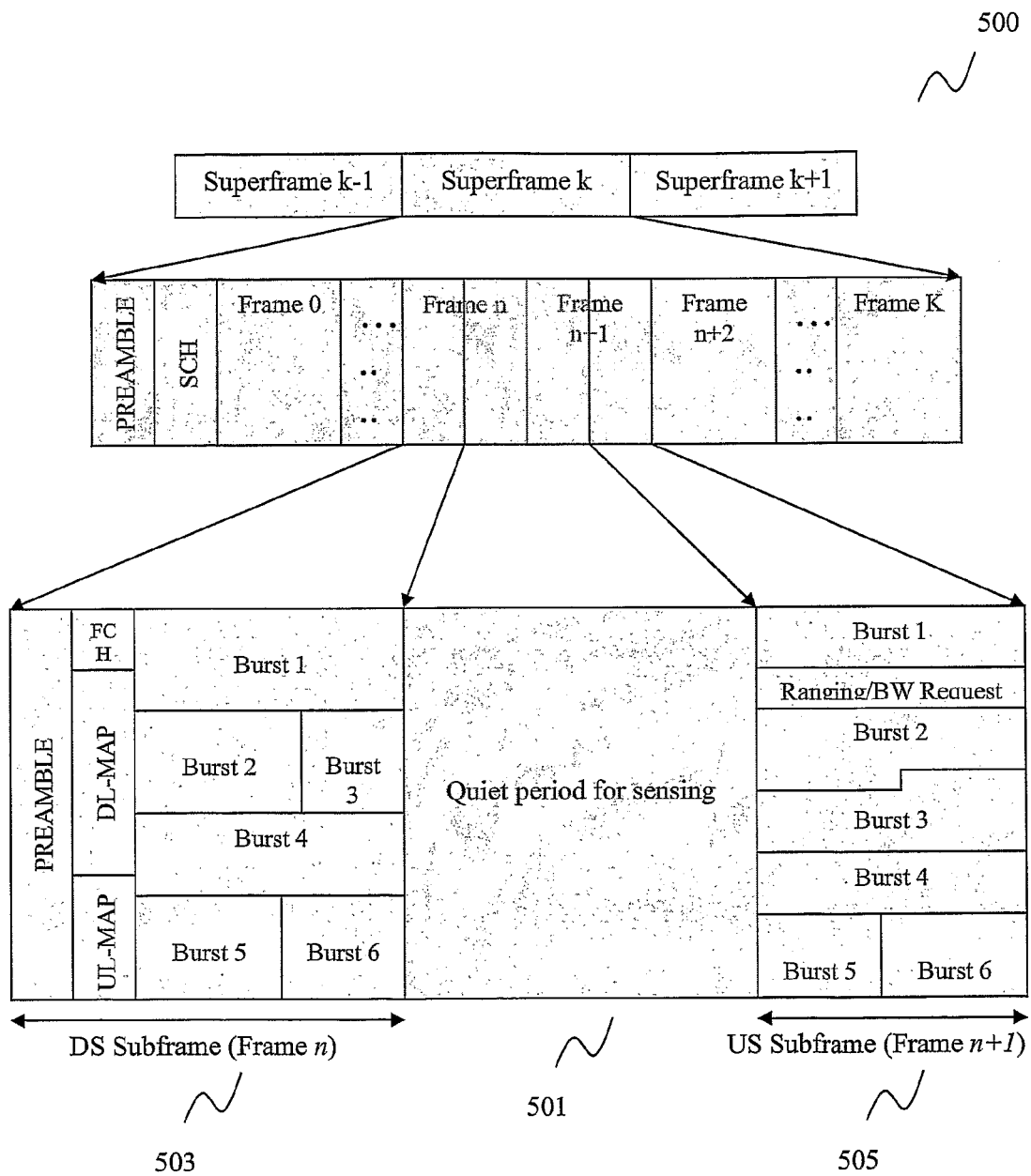
FIG. 5 shows a frame structure where the quiet period allocated includes the TTG time, the uplink subframe of Frame n and the downlink subframe of Frame n+1, according to an embodiment of the invention.

In order for enable this quiet period to be used as a fine sensing quiet period, additional time can be obtained by allocating the subsequent uplink subframe or even the downlink subframe of the following frame, for this quiet period, as shown in FIGS. 4 and 5 respectively. It is important to note from FIGS. 4 and 5 that while the quiet period for sensing has been extended, the boundaries of subsequent frames are still maintained.

FIG. 3 is an illustration of one embodiment, where the data transmission frame structure comprises a downlink subframe provided for the downlink transmission time interval, a sensing subframe provided for the determining of the available frequency and an uplink subframe provided for the uplink transmission time interval, wherein the sensing subframe is arranged between the downlink subframe and the uplink subframe. In this embodiment, the downlink subframe may be the downlink subframe 303, the sensing subframe (which is arranged between the downlink subframe and the uplink subframe) may be the Transmit-Receive Transition Gap time 305 and the uplink subframe may be the uplink subframe 307.

FIG. 4 shows a frame structure 400 according to an embodiment of the invention.

In the frame structure 400, the quiet period for sensing 401 is arranged between the downlink subframe of Frame n 403 and the downlink-subframe of Frame n+1 405. Here, the quiet period for sensing is again arranged to be after a downlink transmission. In this case, additional time is allocated as the quiet period for sensing, and this additional time is taken from the uplink subframe of Frame n and the relevant transition gaps.

FIG. 4 is an illustration of one embodiment, where the method provided further comprising providing a further downlink transmission time interval after the determination of the available frequency ranges. In this embodiment, the further downlink transmission time interval provided after the quiet period for sensing is the downlink subframe of Frame n+1 405.

FIG. 5 shows a frame structure 500 according to an embodiment of the invention.

In the frame structure 500, the quiet period for sensing 501 is arranged between the downlink subframe of Frame n 503 and the uplink subframe of Frame n+1 505. Here, the quiet period for sensing is again arranged to be after a downlink transmission. In this case, additional time is allocated as the quiet period for sensing, and this additional time is taken from the uplink subframe of Frame n, the downlink subframe of Frame n+1 and the relevant transition gaps.

FIG. 5 is an illustration of one embodiment, where the method provided further comprising providing a further uplink transmission time interval after the determination of the available frequency ranges. In this embodiment, the further uplink transmission time interval provided after the quiet period for sensing is the uplink subframe of Frame n+1 505.

FIG. 6 shows a table 600 of Downlink Channel Descriptor (DCD) information elements of Medium Access Control (MAC) messages which may be changed to implement an embodiment of the invention.

Downlink Channel Descriptor (DCD) information is used to describe the physical layer characteristics of the downlink transmission channel. As shown in FIG. 6, the row with Sensing RTG 601 and the row with Channel Number for Sensing RTG 603 may be changed accordingly to implement an embodiment of the invention. An example of the changes to be added and their corresponding values are shown in bold and underlined in the row with Sensing RTG 601 and the row with Channel Number for Sensing RTG 603.

In this document, the following publication is cited:

[1] "A PHY/MAC Proposal for IEEE 802.22 WRAN System, Part 2: The Cognitive MAC", by ETRI, FT, HuaWei, I2R, Motorola, NextWave, Philips, Runcom, Samsung, STM, Thomson, March 2006.

What is claimed is:

1. A method, comprising:
providing a downlink transmission time interval;
determining a plurality of available frequency ranges within a plurality of candidate frequency ranges for at least one communication device of a communication system, wherein an other communication system has a priority of usage of the plurality of candidate frequency ranges, wherein determining the plurality of available frequency ranges comprises:
determining, after providing the downlink transmission time interval, for each candidate frequency range of the plurality of candidate frequency ranges, either that the candidate frequency range is an available frequency range within the plurality of candidate frequency ranges for the at least one communication device to operate in when the other communication system is at least temporarily not in operation in the candidate frequency range, or that the candidate frequency range is an unavailable frequency range when the other communication system is in operation in the candidate frequency range;
providing an uplink transmission time interval for the plurality of available frequency ranges;
determining that the other communication system is resuming operation in a particular candidate frequency range of the plurality of candidate frequency ranges; and
vacating the particular candidate frequency range.

2. The method of claim 1, further comprising:
providing a further downlink transmission time interval after determining the plurality of available frequency ranges.

3. The method of claim 1, further comprising providing a plurality of further uplink transmission time intervals after determining the plurality of available frequency ranges.

4. The method of claim 1, further comprising:
providing a plurality of further downlink transmission time intervals after determining the plurality of available frequency ranges.

5. The method of claim 1, further comprising
waiting a predetermined time period after the downlink transmission time interval;
determining the plurality of available frequency ranges within the plurality of candidate frequency ranges after an expiration of the predetermined time period.

6. The method of claim 5,
the predetermined time period being dimensioned such that downlink transmission signals have been completely transmitted via the candidate frequency ranges.

7. The method of claim 1, the method being carried out within at least one data transmission frame structure, wherein the at least one data transmission frame structure comprises:
a downlink subframe provided for the downlink transmission time interval;
a sensing subframe provided for the determining of the available frequency; and
an uplink subframe provided for the uplink transmission time interval;
the sensing subframe being arranged between the downlink subframe and the uplink subframe.

8. The method of claim 7, further comprising the sensing subframe being dependent on a geographical distance between the at least one communication device and the other communication device.

9. The method of claim 8, the other communication device being a base station.

10. The method of claim 1, the method being carried out within at least one data transmission frame structure, wherein the at least one data transmission frame structure comprises a frame group comprising a header portion and a plurality of frames;
wherein the header portion of the frame group comprises:
a downlink subportion for the downlink transmission time interval; and
a sensing subportion provided for the determining of the available frequency.

11. The method of claim 10, further comprising the sensing subportion being dependent on a geographical distance between the at least one communication device and the other communication device.

12. The method of claim 11, the other communication device being a base station.

13. The method of claim 1, further comprising
after determining the plurality of available frequency ranges,
combining the plurality of available frequency ranges to at least one combined logical frequency range; and
allocating the at least one combined logical frequency range to the at least one communication device.

14. The method of claim 1, wherein determining the plurality of available frequency ranges comprises:
scanning the plurality of candidate frequency ranges;
determining, whether a signal transmission in a respective candidate frequency range of the plurality of candidate frequency ranges is below a predetermined threshold, and
in case the signal transmission in the respective candidate frequency range is below the predetermined threshold, then classifying the respective candidate frequency range as a respective available frequency range of the plurality of available frequency ranges.

15. The method of claim 1, further comprising using a multiple access transmission technology.

16. The method of claim 15, the multiple access transmission technology being selected from a group of multiple access transmission technologies consisting of:
time division multiple access,
frequency division multiple access,
code division multiple access, and
orthogonal frequency division multiple access.

17. The method of claim 1, wherein determining the plurality of available frequency ranges comprises:
scanning the plurality of candidate frequency ranges;
determining, whether a signal transmission in a respective candidate frequency range of the plurality of candidate frequency ranges is below a predetermined threshold, and
in case the signal transmission in the respective candidate frequency range is not below the predetermined threshold, then performing at least one of skipping the respective candidate frequency range or classifying the respective candidate frequency range as being a respective non-available frequency range.

18. A frequency ranges determination device, comprising:
a first unit configured to provide a downlink transmission time interval;
a determination unit configured to:

determine a plurality of available frequency ranges within a plurality of candidate frequency ranges for at least one communication device of a communication system, wherein an other communication system has a priority of usage of the plurality of candidate frequency ranges, wherein determining the plurality of available frequency ranges comprises:

determining, after providing the downlink transmission time interval, for each candidate frequency range of the plurality of candidate frequency ranges, either that the candidate frequency range is an available frequency range within the plurality of candidate frequency ranges for the at least one communication device to operate in when the other communication system is at least temporarily not in operation in the candidate frequency range, or that the candidate frequency range is an unavailable frequency range when the other communication system is in operation in the candidate frequency range;

and determine that the other communication system is resuming operation in a particular candidate frequency range of the plurality of candidate frequency ranges; and vacate the particular candidate frequency range;

and a second unit configured to provide an uplink transmission time interval for the plurality of available frequency ranges.

19. A communication device, comprising:

a frequency ranges determination device, comprising:

a first unit configured to provide a downlink transmission time interval;

a determination unit configured to:

determine a plurality of available frequency ranges within a plurality of candidate frequency ranges for at least one communication device of a communication system, wherein an other communication system has a priority of usage of the plurality of candidate frequency ranges, wherein determining the plurality of available frequency ranges comprises:

determining, after providing the downlink transmission time interval, for each candidate frequency range of the plurality of candidate frequency ranges, either that the candidate frequency range is an available frequency range within the plurality of candidate frequency ranges for the at least one communication device to operate in when the other communication system is at least temporarily not in operation in the candidate frequency range, or that the candidate frequency range is an unavailable frequency range when the other communication system is in operation in the candidate frequency range;

and determine that the other communication system is resuming operation in a particular candidate frequency range of the plurality of candidate frequency ranges; and vacate the particular candidate frequency range;

and a second unit configured to provide an uplink transmission time interval for the plurality of available frequency ranges.

20. The communication device of claim 19, being a wireline communication device.

21. The communication device of claim 19, being a powerline communication device.

22. The communication device of claim 19, being a radio communication device.

23. The communication device of claim 22, being a mobile radio communication device.

24. The communication device of claim 22, being a satellite radio communication device.

25. The communication device of claim 22, being a mobile radio base station.

26. The communication device of claim 19, being a terminal communication device.

27. The communication device of claim 19, being a Consumer Premise Equipment device.

* * * * *